July 4, 1961 W. R. MILNER 2,991,109
BUMPER AND DRAFT-DEFLECTOR SUPPORT STRUCTURE
Filed Sept. 27, 1954 2 Sheets-Sheet 1
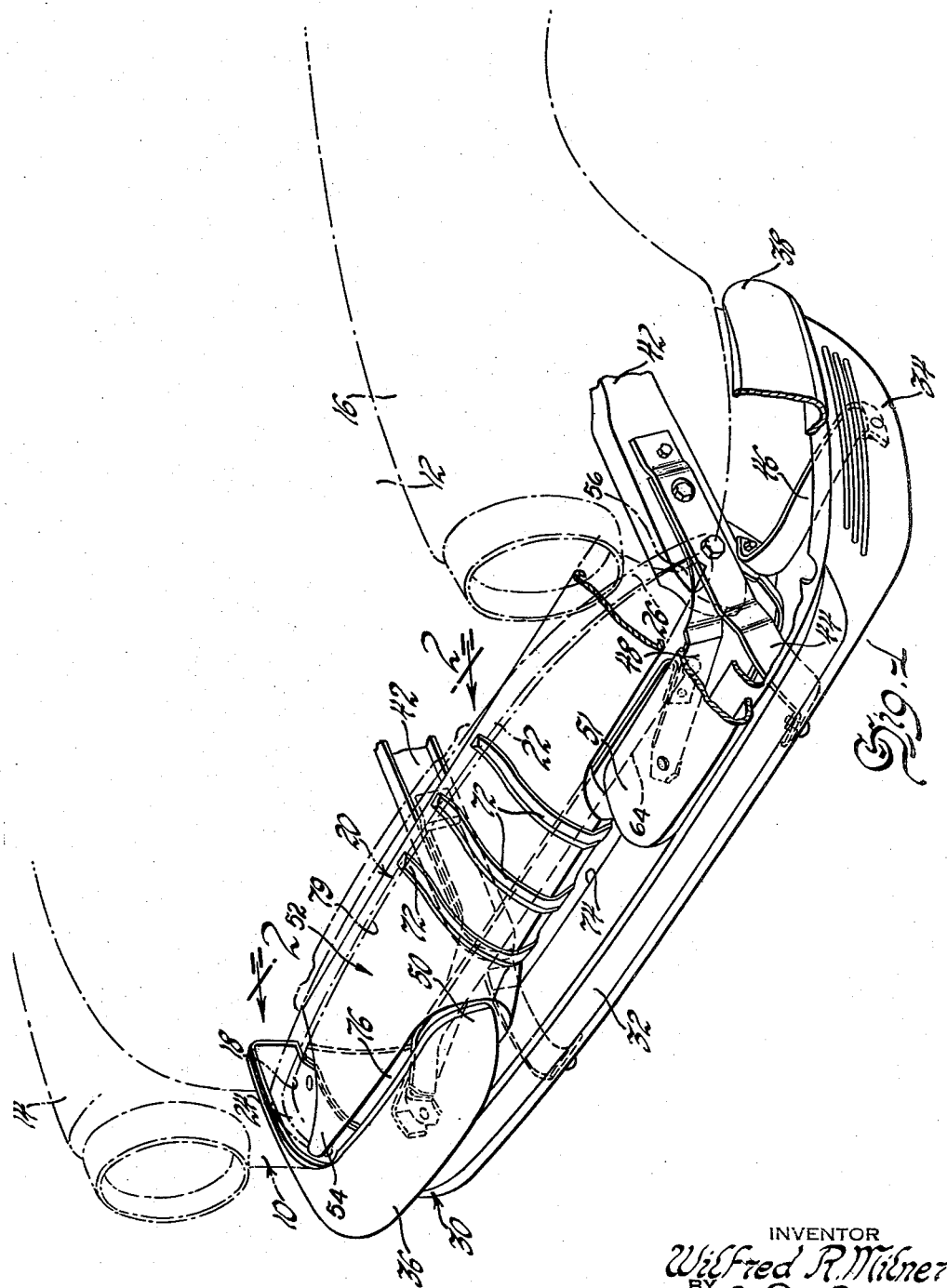
INVENTOR
Wilfred R. Milner
BY
L. D. Buch
ATTORNEY

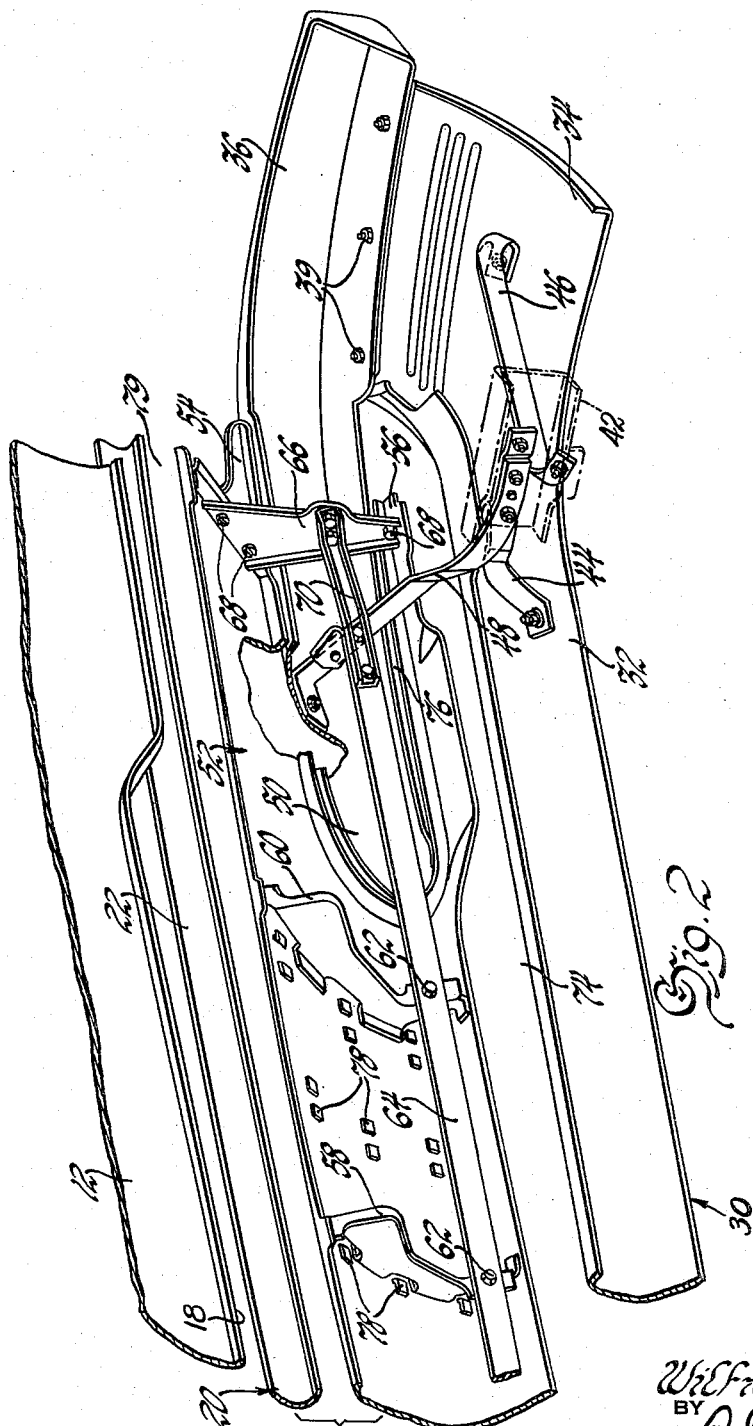

Patent

2,991,109
BUMPER AND DRAFT-DEFLECTOR SUPPORT STRUCTURE
Wilfred R. Milner, Franklin, Mich., assignor to General Motors Corporation, Detroit, Mich., a corporation of Delaware
Filed Sept. 27, 1954, Ser. No. 458,322
3 Claims. (Cl. 293—63)

This invention relates to bumper members in general and more particularly to front bumper members for use with automotive and other vehicles.

Bumper members are generally disposed near the front and rear of automotive and other vehicles to protect the vehicle body from damage. Those bumper members which are provided at the front of a vehicle have, of late, been disposed closer to the vehicle body and have been formed to include a grille work in front of or inside the radiator grille opening. A grille structure which is a part of the bumper members must be of sturdy stock in order to stand up under the impact forces received by the bumper members. Those grille structures which are secured to the vehicle body rather than the bumper and which are disposed behind the closer mounted bumper structures are easily damaged by impact blows or forces overriding the bumper bars. Neither of these alternatives therefore is entirely satisfactory since, although one enables the use of less expensive materials the grille is subjected to a greater chance of damage, while the other is overly expensive to begin with.

It is now proposed to provide a combination bumper and grille wherein the grille structure may be formed of sheet material and while disposed in close proximity to the bumper impact members is not subjected to the likelihood of damage thereby. It is proposed to provide a grille structure which is not secured to either the vehicle body or the bumpers, but instead is separately secured to the vehicle frame as are the impact members. The grille structure is disposed, in a sense, behind the impact members and at the same time is formed to receive the impact members in spaced relation to allow for limited relative movement without damage to the grille. The bumper or impact members comprise a lower impact bar extended across the vehicle and wrapping the sides thereof with upper impact bars or bumper guards secured to the ends of the lower bar and extended inwardly in front of the grille opening and in spaced relation to the lower bar. The grille structure includes a draft deflection plate disposed behind the impact bars and within the grille opening formed in the vehicle body. The upper impact bars are received in spaced relation within forked arms formed on each end of the deflection plate. The deflection plate cooperates with the upper impact bars in appearance to close the grille opening while, in fact, being separate therefrom. The proposed structure thereby provides a combination bumper and grille wherein the grille structure is not secured to the vehicle body nor to the bumper members, but is protected by the bumper members, and at the same time provides a structure which may be formed of less expensive sheet materials because of the protective disposition of the upper impact members and the permissive relative movement between the impact bars and grille.

In the drawings:
FIGURE 1 is a front perspective view of the proposed bumper grille combination as provided on an automotive vehicle.
FIGURE 2 is a rear perspective view of the bumper grille of FIGURE 1 taken substantially in the plane of line 2—2 and viewed in the direction of the arrows thereon.

The proposed bumper grille is adapted to be secured to a vehicle body 10 which includes a hood 12 and fenders 14 and 16. A draft or radiator grille opening 18 is provided in the vehicle hood 12 near the front thereof and is bounded by an ornamental edging 20 which includes a central portion 22 and end portions 24 and 26 secured to the fenders 14 and 16 respectively.

A bumper structure 30 is secured to the front of the vehicle 10 and includes a lower impact bar 32 extending across the front of the body 10 and being formed around the sides of fenders 14 and 16. The impact bar 32 is formed upwardly near the ends 34 thereof, providing a greater vertical cross-section than at the mid-section thereof, to receive upper impact bars or bumper guards 36 and 38. The upper impact bars 36 and 38 are secured to the upwardly extended ends 34 of the lower impact bar by fastening means 39 and are formed around the fenders 14 and 16 to extend in cantilevered spaced relation inwardly towards each other in front of the opening 18 provided in hood 12. The lower impact bar 32 is secured to the frame side rails or members 42 of the vehicle by bumper straps 44 and 46. The bumper straps 44 are secured to the forward part of the lower impact bar 32 and the other straps 46 to the ends 34 thereof. Extended bumper straps 48 are also secured to the frame side rails 42 and extend outwardly to engage the otherwise unsupported ends 50 and 51 of the upper impact bars 36 and 38 respectively.

A draft deflector pan or plate 52 is disposed within the opening 18 of the hood 12 and is formed to provide a grille member for directing incoming air upwardly. The draft deflector 52 includes fork arms 54 and 56 on each end thereof between which are received the ends 50 and 51 of the upper impact bars 36 and 38. The impact bars 36 and 38 are disposed in spaced relation to the fork arms 54 and 56. A pair of depending bracket members 58 and 60 are secured to the back side of the deflector plate 52 near the center thereof and have secured thereto by fastening means 62 a longitudinal brace or supporting bar 64. The ends of the bar 64 are secured to the bumper bracing straps 48 thereby supporting the deflector plate within the draft opening 18. The deflector 52 is disposed near the rearmost edge of the upper impact bars and substantially in the plane of the lower impact bar or member 32. Additional support is provided the deflector plate 52 by a bracket 66 secured by fastening means 68 to the fork arms 54 and 56. A channeled extension brace 70 is secured to the bracket 66 and support bar 64 to tie the bracket 66 to the longitudinal support bar. Ornamental members 72 are secured to the face of the deflector plate 52 between the impact bars 36 and 38 to strengthen the plate and to provide a more pleasing appearance. Such members are provided with tabs 78 extended through the plate 52 and bent over as is shown in FIGURE 2.

The upper impact bars 36 and 38 are disposed in spaced relation to and forwardly of the central portion of the lower impact bar 32. The deflector plate 52 is disposed in spaced relation above the central portion of the lower impact bar 32 and has its forked arms 54 and 56 disposed in spaced relation about the ends 50 and 51 of the upper impact bars 36 and 38. This arrangement provides the general appearance of closing the opening 18 formed in the hood 12 while at the same time providing opening 74 between the deflector plate and the lower impact bar and draft passages 76 between the arms 54 and 56 of the deflector plate and the ends 50 and 51 of the upper impact bars 36 and 38. In addition, of course, is the induction space 79 provided above the deflector plate 52 between it and the edging 20 provided on the hood member 12.

I claim:
1. An automotive vehicle bumper assembly for attach- ment to the forwardly projecting frame members of a vehicle body and including an impact bar extending across the end of said vehicle body and having the ends thereof extended around said vehicle body and longitudinally thereof, vehicle bumper guard members each secured at one end to the respective ends of said impact bar and having the other ends thereof formed and extended in spaced relation over said impact bar and in spaced aligned relation to each other, and bumper-frame braces for securing said impact bar and bumper guard members to said vehicle frame and comprising braces engaged with the ends of said impact bar and with the free ends of said bumper guards and each converging together and being secured to one of said forwardly projecting frame members.

2. A bumper grille combination for automotive and other vehicles which includes a lower impact bar secured to a vehicle frame and extended across the end of a vehicle body mounted on said frame, upper impact bars secured to the ends of said lower impact bar and extended inwardly towards each other, the ends of said upper impact bars being disposed in spaced relation to each other and to said lower impact bar, and a draft deflector plate secured to said vehicle frame and having forked ends received about the inwardly extended ends of said upper impact bars and in spaced relation thereto, said deflector plate being disposed near the back of said impact bars and within a suitable opening formed within the end of said vehicle body.

3. A bumper grille including an elongated impact member having parallel transversely formed ends, bumper guards secured to the ends of said impact member, said guards being bent and formed to include aligned ends extending inwardly towards each other in substantially parallel spaced relation over said impact member, and a draft deflector plate disposed in spaced relation over said impact member and about said aligned ends of said bumper guards, said deflector plate including forked arms provided at opposite ends thereof and received about said aligned ends of said bumper guards, and brace members secured to a vehicle frame for fastening said impact member, bumper guards and deflector plate thereto in such spaced relation.

References Cited in the file of this patent

UNITED STATES PATENTS

| | | |
|---|---|---|
| D. 117,181 | Jandus | Oct. 17, 1939 |
| D. 175,678 | Gillan | Sept. 27, 1955 |
| 1,558,457 | Begelman | Oct. 27, 1925 |
| 1,695,653 | Heltzel | Dec. 18, 1928 |
| 2,039,004 | Jandus et al. | Apr. 28, 1936 |
| 2,162,099 | McGregor | June 13, 1939 |
| 2,194,459 | Frank | Mar. 26, 1940 |
| 2,213,592 | Reyburn | Sept. 3, 1940 |
| 2,215,001 | Jandus | Sept. 17, 1940 |
| 2,236,670 | Cadwallader et al. | Apr. 1, 1941 |
| 2,252,537 | Wilson | Aug. 12, 1941 |
| 2,253,931 | Devor | Aug. 26, 1941 |
| 2,329,874 | Cadwallader | Sept. 21, 1943 |
| 2,358,486 | Zeeb | Sept. 19, 1944 |
| 2,585,530 | Bennett | Feb. 12, 1952 |
| 2,621,955 | Dykstra | Dec. 16, 1952 |
| 2,633,379 | Kraeft | Mar. 31, 1953 |
| 2,722,447 | Nickles | Nov. 1, 1955 |
| 2,759,755 | Johnson | Aug. 21, 1956 |